US012466186B2

(12) United States Patent
Tanaka et al.

(10) Patent No.: US 12,466,186 B2
(45) Date of Patent: Nov. 11, 2025

(54) LIQUID DISCHARGE APPARATUS

(71) Applicant: SEIKO EPSON CORPORATION, Tokyo (JP)

(72) Inventors: Takuto Tanaka, Shiojiri (JP); Akiho Seshimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 149 days.

(21) Appl. No.: 18/395,803

(22) Filed: Dec. 26, 2023

(65) Prior Publication Data

US 2024/0208229 A1 Jun. 27, 2024

(30) Foreign Application Priority Data

Dec. 26, 2022 (JP) ................................ 2022-207767

(51) Int. Cl.
*B41J 2/165* (2006.01)

(52) U.S. Cl.
CPC ....... *B41J 2/16588* (2013.01); *B41J 2/16511* (2013.01); *B41J 2002/16576* (2013.01); *B41J 2002/16582* (2013.01)

(58) Field of Classification Search
CPC ................ B41J 2/16588; B41J 2/16511; B41J 2002/16576; B41J 2002/16582; B41J 2/16508; B41J 2/16517; B41J 2/16538; B41J 2/01
See application file for complete search history.

(56) References Cited

U.S. PATENT DOCUMENTS

2022/0097379 A1* 3/2022 Amano .................. B41J 25/304

FOREIGN PATENT DOCUMENTS

JP 2022-055782 A 4/2022

* cited by examiner

*Primary Examiner* — Bradley W Thies
(74) *Attorney, Agent, or Firm* — Workman Nydegger

(57) ABSTRACT

A movement section is configured to move one of the liquid discharge section and the maintenance section toward another of the liquid discharge section and the maintenance section in a first direction. A maintenance section includes first and second positioning sections that perform positioning of the maintenance section and the liquid discharge section by coming into contact with the liquid discharge section. The first positioning section is provided at a position farther than the second positioning section in a second direction intersecting with a first direction with, as a reference, an action point at which the movement section acts on the one of the liquid discharge section and the maintenance section. The first positioning section comes into contact with the liquid discharge section before the second positioning section when the one of the liquid discharge section and the maintenance section moves toward the other.

10 Claims, 6 Drawing Sheets

LIQUID DISCHARGE APPARATUS

The present application is based on, and claims priority from JP Application Serial Number 2022-207767, filed Dec. 26, 2022, the disclosure of which is hereby incorporated by reference herein in its entirety.

BACKGROUND

1. Technical Field

The present disclosure relates to a liquid discharge apparatus that can discharge liquid.

2. Related Art

For example, JP-A-2022-55782 discloses a liquid discharge apparatus that performs recording on a medium by discharging liquid from a liquid discharge section. Further, the liquid discharge apparatus includes a maintenance section that performs maintenance of the liquid discharge section. Examples of the maintenance section include a cap section that can cover a nozzle surface of the liquid discharge section and a wiping section that can wipe the nozzle surface of the liquid discharge section.

In such a liquid discharge apparatus, any one of the liquid discharge section and the maintenance section can move toward the other of the liquid discharge section and the maintenance section. In addition, the maintenance section includes a positioning section. The liquid discharge section and the maintenance section are positioned by the positioning section coming into contact with the liquid discharge section.

However, in such a liquid discharge apparatus, the positioning of the liquid discharge section and the maintenance section may be unstable. Therefore, it is desired to improve the positioning accuracy of the liquid discharge section and the maintenance section.

SUMMARY

The present disclosure is a liquid discharge apparatus including a liquid discharge section configured to discharge liquid, a maintenance section that performs maintenance of the liquid discharge section, and a movement section configured to move one of the liquid discharge section and the maintenance section toward another of the liquid discharge section and the maintenance section along a first direction intersecting with a horizontal direction and a vertical direction, in which the maintenance section includes a first positioning section and a second positioning section, the first positioning section and the second positioning section perform positioning of the maintenance section and the liquid discharge section by coming into contact with the liquid discharge section, the first positioning section is provided at a position farther than the second positioning section in a second direction intersecting with the first direction with, as a reference, an action point at which the movement section acts on the one of the liquid discharge section and the maintenance section, and the first positioning section comes into contact with the liquid discharge section before the second positioning section when the one of the liquid discharge section and the maintenance section moves toward the other of the liquid discharge section and the maintenance section.

DESCRIPTION OF EMBODIMENTS

First Embodiment

A first embodiment of a liquid discharge apparatus will be described below with reference to the accompanying drawings. In the following description, assuming that the liquid discharge apparatus of the present embodiment is placed on a horizontal surface, a direction intersecting with (for example, orthogonal to) a vertical direction Z is a width direction X. One of the width directions X is set as a first width direction X1, and the other of the width directions X is set as a second width direction X2. An upper side in the vertical direction Z is defined as an upper side Z1, and a lower side in the vertical direction Z is defined as a lower side Z2.

Configuration of Liquid Discharge Apparatus 11

Figure 1:
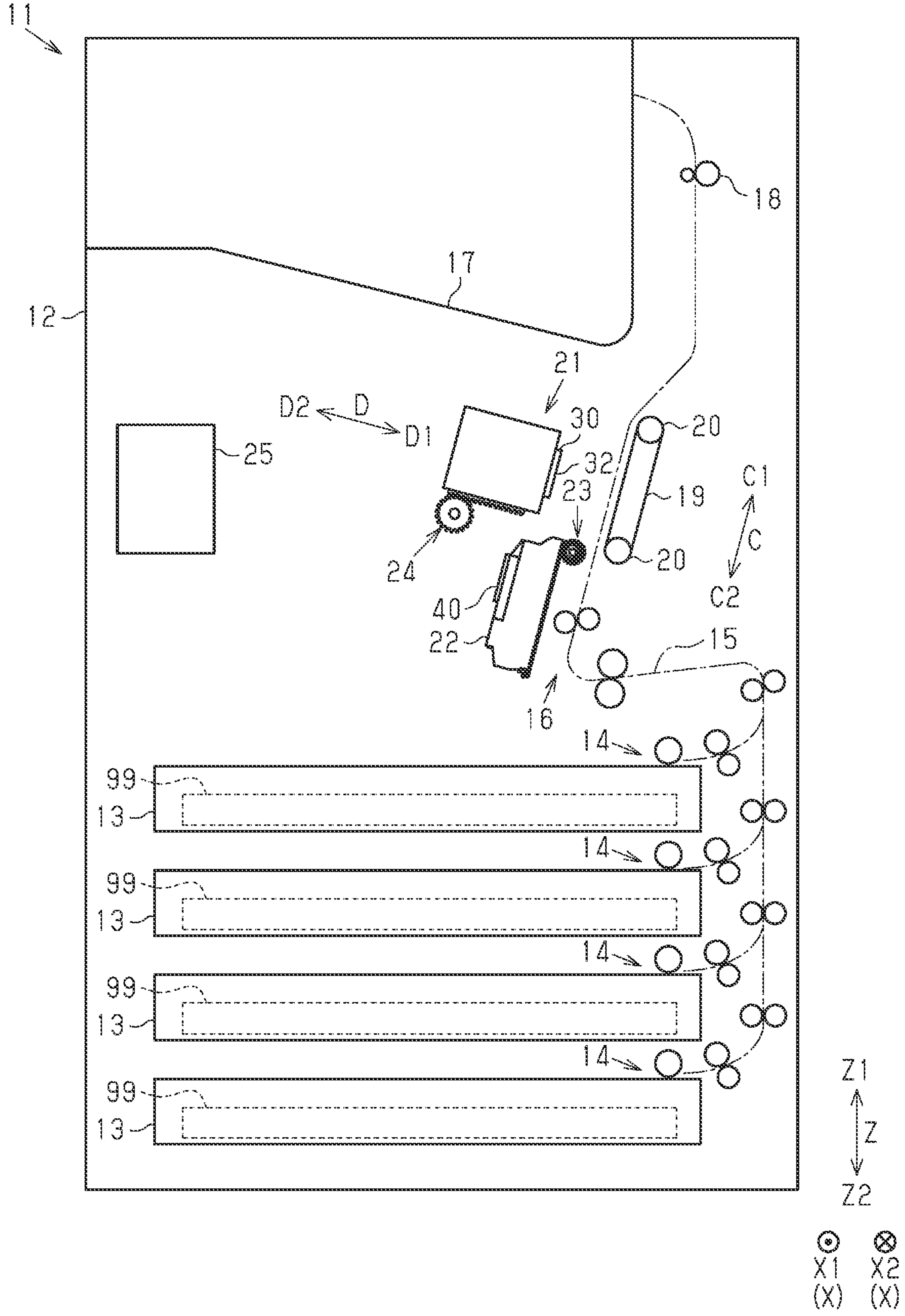
FIG. 1 is a schematic view of a liquid discharge apparatus.

As illustrated in FIG. 1, a liquid discharge apparatus 11 is an apparatus that can discharge liquid. The liquid discharge apparatus 11 may be an ink jet printer that performs recording by discharging ink, which is an example of the liquid, onto a medium. The medium may be, for example, paper, cloth, vinyl, a plastic component, a metal component, and the like.

The liquid discharge apparatus 11 may include a housing 12, a medium accommodation section 13, a feed section 14, a transport path 15, a transport section 16, and a stacker 17. The liquid discharge apparatus 11 may include a plurality of medium accommodation sections 13 and the same number of feed sections 14 as the medium accommodation sections 13.

The housing 12 is configured to accommodate various members that configure the liquid discharge apparatus 11. The medium accommodation section 13 may be configured to accommodate a plurality of media 99 in a stacked state. The feed section 14 feeds out the medium 99 accommodated in the medium accommodation section 13 one by one from the corresponding medium accommodation section 13 to the transport path 15.

The transport path 15 is a path through which the medium 99 is transported by the transport section 16. The transport path 15 couples the medium accommodation section 13 and the stacker 17. In FIG. 1, the transport path 15 is illustrated by a one-dot chain line. The stacker 17 receives the transported medium 99.

The transport section 16 transports the medium 99 fed out by the feed section 14 along the transport path 15. The transport section 16 discharges the transported medium 99 to the stacker 17. The transport section 16 may include a plurality of transport rollers 18. Each of the plurality of transport rollers 18 transports the medium 99 by rotating in a state in which the medium 99 is interposed therebetween.

The transport section 16 may include an endless transport belt 19 and a pair of pulleys 20. The transport belt 19 is hung over the pair of pulleys 20. The transport belt 19 transports the medium 99 along a transport direction C1 by rotating in a state in which the medium 99 is adsorbed thereon. The transport belt 19 functions as an example of a support section that supports the medium 99.

The liquid discharge apparatus 11 includes a liquid discharge section 21. The liquid discharge section 21 can discharge the liquid. The liquid discharge section 21 is provided at a position along the transport path 15. The liquid discharge section 21 is configured to perform recording on the medium 99 by discharging the liquid onto the medium 99 supported by the transport belt 19. The liquid discharge section 21 may be configured to discharge the liquid in a discharge direction D1. The discharge direction D1 is a direction perpendicular to the transport direction C1 of the medium 99. The discharge direction D1 may have an angle of 15 degrees with a horizontal direction.

The liquid discharge section 21 is a line head, but may be a serial head. The line head is a head that can simultaneously discharge the liquid across a width of the medium 99. The serial head is a head that scans the medium 99 in the width direction X.

The liquid discharge apparatus 11 includes a maintenance section 22. The maintenance section 22 performs maintenance of the liquid discharge section 21. As will be described below in detail, the maintenance section 22 can perform the maintenance of the liquid discharge section 21 in a state of being into contact with a nozzle surface 32 of the liquid discharge section 21.

The liquid discharge apparatus 11 includes a maintenance movement section 23. The maintenance movement section 23 can move the maintenance section 22 along a second movement direction C. The second movement direction C is a direction along the transport direction C1. The second movement direction C includes the transport direction C1 and a direction C2 opposite to the transport direction C1. The second movement direction C is a direction intersecting with the horizontal direction and the vertical direction Z.

The liquid discharge apparatus 11 includes a movement section 24. The movement section 24 is configured to move the liquid discharge section 21 along a first movement direction D. The first movement direction D is a direction along the discharge direction D1. The first movement direction D includes the discharge direction D1 and a direction D2 opposite to the discharge direction D1. The first movement direction D is a direction intersecting with the horizontal direction and the vertical direction Z.

The liquid discharge apparatus 11 may include a control section 25. The control section 25 comprehensively controls driving of each mechanism in the liquid discharge apparatus 11 and controls various operations executed in the liquid discharge apparatus 11. In particular, the control section 25 may control the feed section 14, the transport section 16, the liquid discharge section 21, the maintenance movement section 23, and the movement section 24.

The control section 25 can be configured as a circuit including α: one or more processors that execute various types of processing according to a computer program, β: one or more dedicated hardware circuits that execute at least a part of various types of processing, or γ: a combination thereof. The hardware circuit is, for example, an application specific integrated circuit. The processor includes a CPU and a memory, such as a RAM and a ROM, and the memory stores a program code or a command configured to cause the CPU to execute processing. The memory, that is, a computer readable medium includes any readable medium accessible by a general-purpose or dedicated computer.

Configurations of Liquid Discharge Section 21 and Maintenance Section 22

Here, configurations of the liquid discharge section 21 and the maintenance section 22 will be described with reference to FIGS. 2 to 5.

Figure 2:
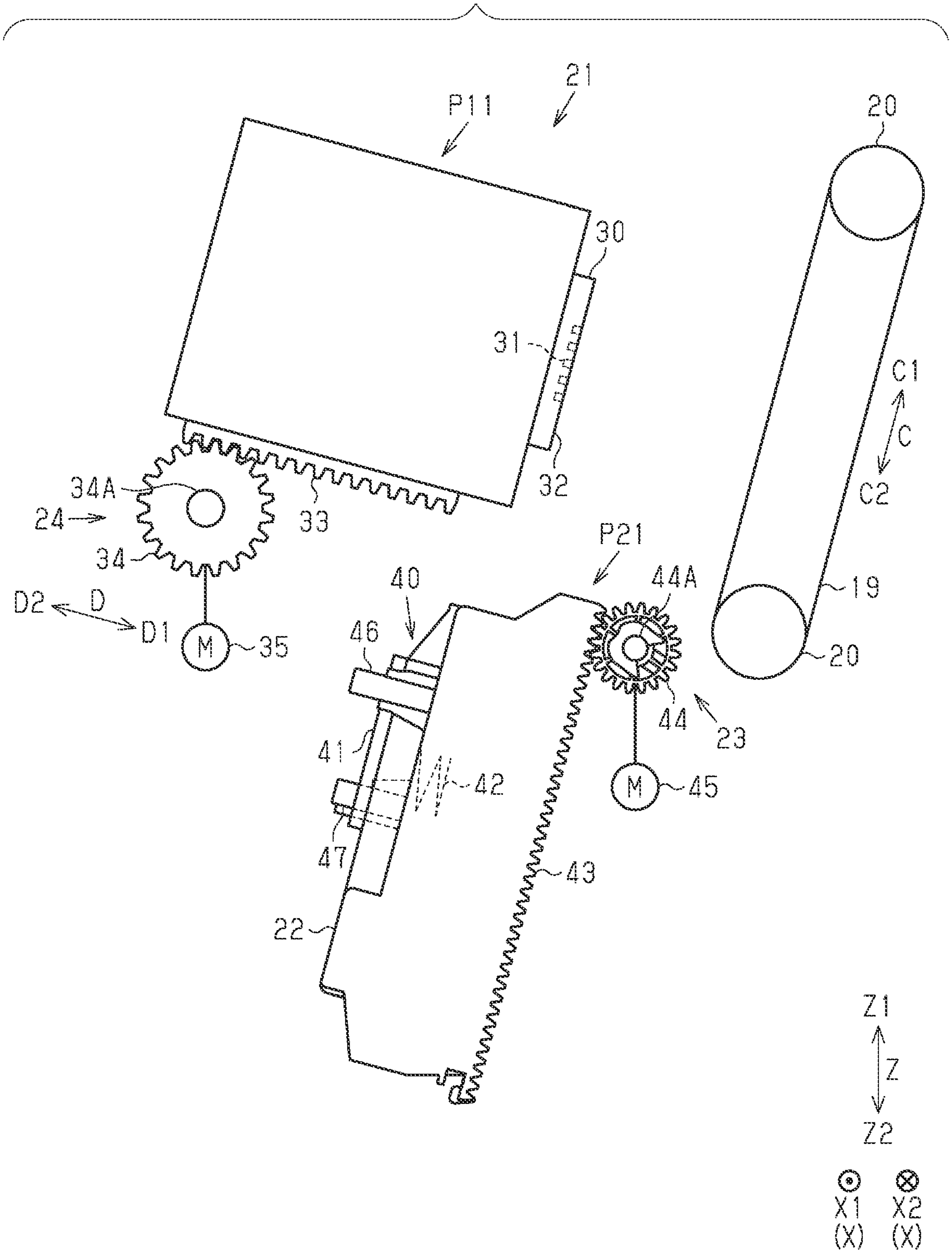
FIG. 2 is a schematic view illustrating a liquid discharge section and a maintenance section.
Figure 3:
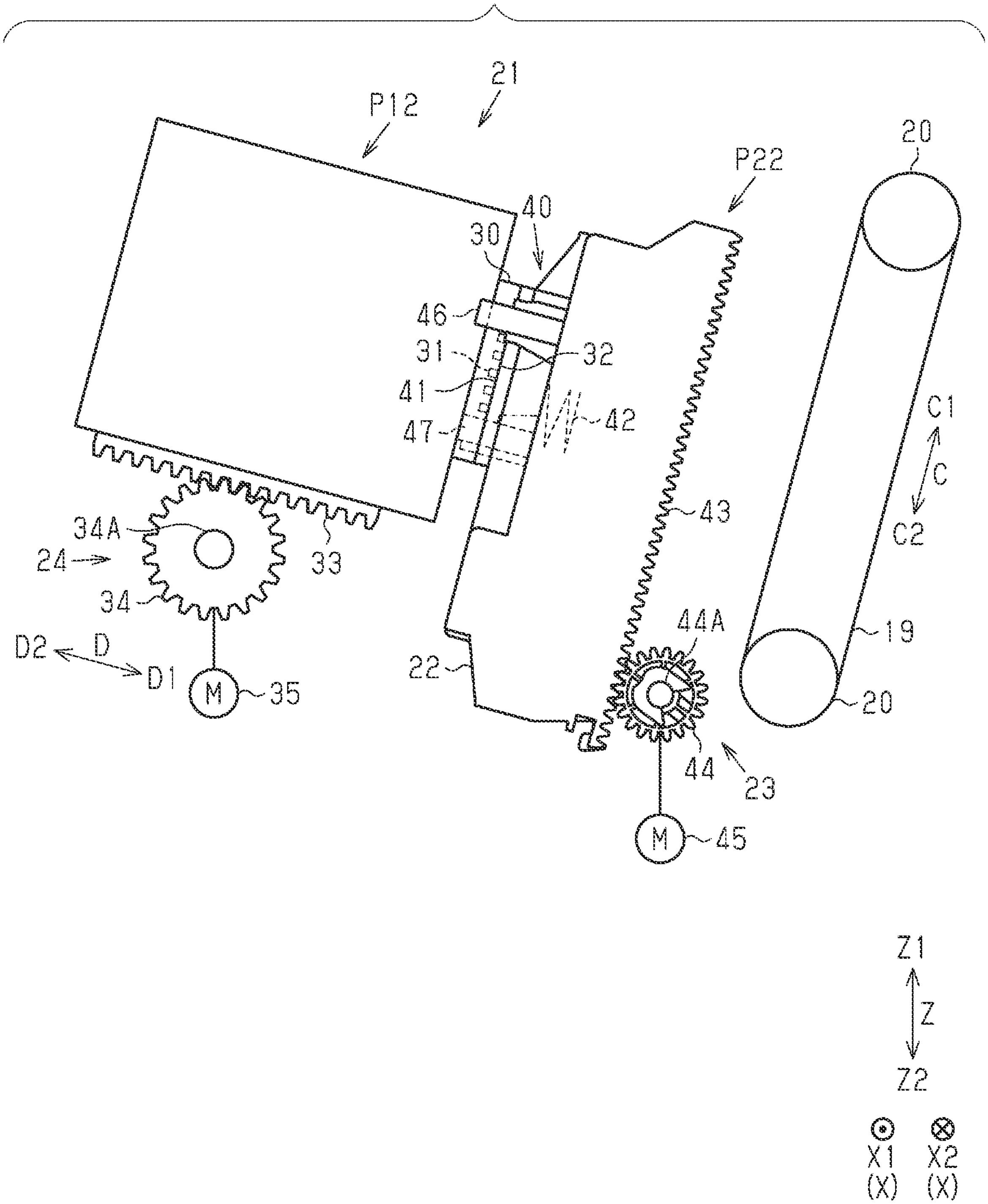
FIG. 3 is a schematic view illustrating the liquid discharge section and the maintenance section.
Figure 4:
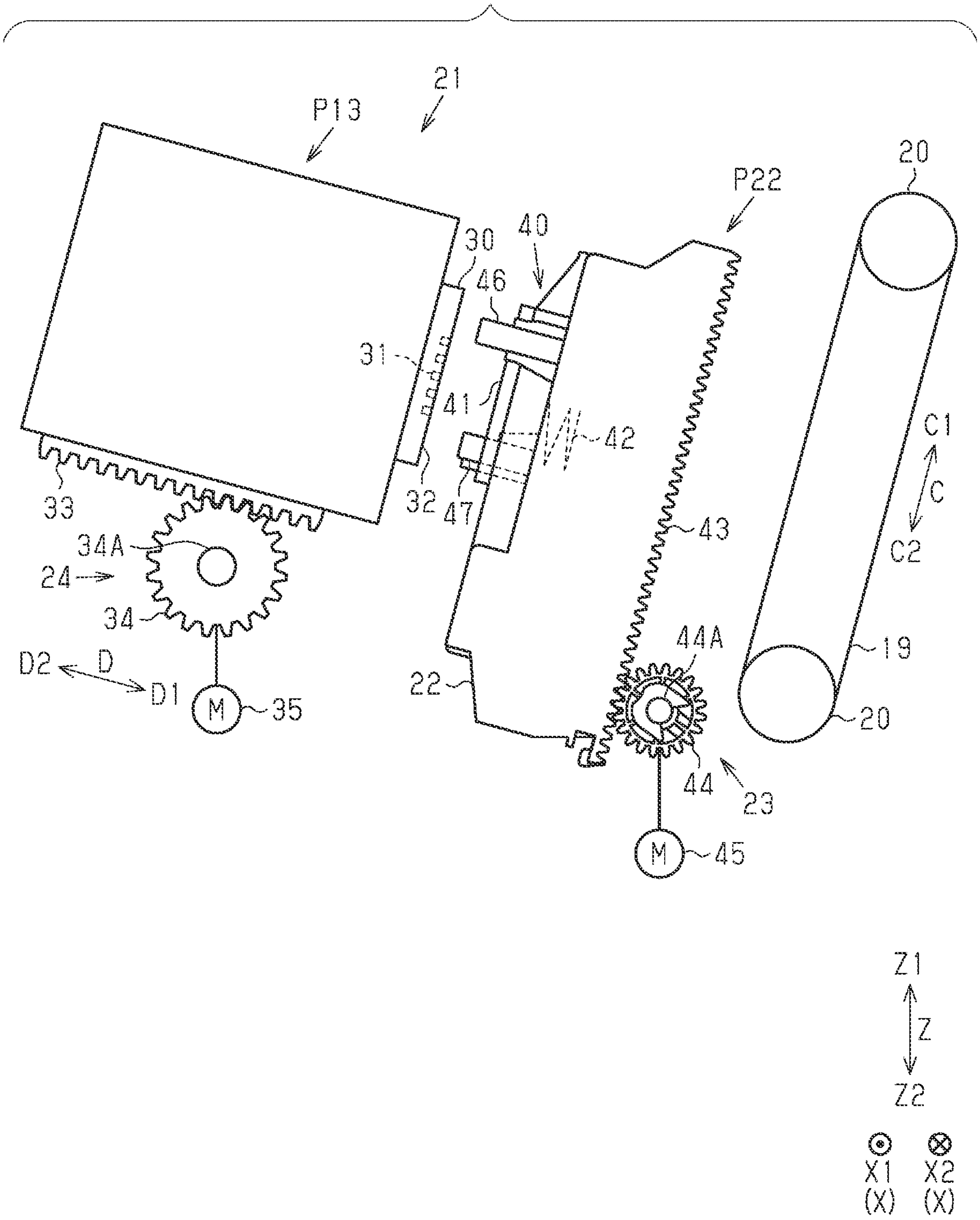
FIG. 4 is a schematic view illustrating the liquid discharge section and the maintenance section.

As illustrated in FIGS. 2 to 4, the liquid discharge section 21 includes a nozzle section 30. The nozzle section 30 is configured to discharge the liquid. The nozzle section 30 includes a nozzle 31 and the nozzle surface 32. The nozzle section 30 may include a plurality of nozzles 31. The nozzle 31 is configured to discharge the liquid. The nozzle 31 is open on nozzle surface 32. In other words, the nozzle surface 32 is configured such that the nozzle 31 is open. The nozzle surface 32 is a surface orthogonal to the discharge direction D1. As described above, the liquid discharge section 21 can discharge the liquid in the discharge direction D1 perpendicular to the nozzle surface 32.

The liquid discharge section 21 includes a first rack 33. The first rack 33 is provided on a side of the direction C2 opposite to the transport direction C1 of the liquid discharge section 21. The first rack 33 is provided to extend along the first movement direction D.

The movement section 24 may be located on a lower side Z2 than the liquid discharge section 21. The movement section 24 includes a first wheel 34. The first wheel 34 is mounted to rotate about a first rotation shaft 34A. The first rotation shaft 34A is provided to extend along the width direction X. The first wheel 34 can be fitted with the first rack 33.

The movement section 24 includes a first driving source 35. The first driving source 35 is a driving source of the first wheel 34. The first driving source 35 may be a motor. The movement section 24 rotates the first wheel 34 about the first rotation shaft 34A by power from the first driving source 35. The movement section 24 moves the liquid discharge section 21 along the first movement direction D by the rotated first wheel 34 being fitted with the first rack 33.

In this way, the movement section 24 acts on the liquid discharge section 21 in the direction C2 opposite to the transport direction C1. In other words, an action point at which the movement section 24 acts on the liquid discharge section 21 is on the side of the direction C2 opposite to the transport direction C1 of the liquid discharge section 21.

The liquid discharge section 21 can move to a discharge position P11 illustrated in FIG. 2, a maintenance position P12 illustrated in FIG. 3, and a retracted position P13 illustrated in FIG. 4 along the first movement direction D by the driving of the movement section 24. In other words, the movement section 24 can move the liquid discharge section 21 to the discharge position P11, the maintenance position P12, and the retracted position P13.

As illustrated in FIG. 2, the discharge position P11 is a position when the liquid discharge section 21 discharges the liquid to the medium 99. Out of the discharge position P11, the maintenance position P12, and the retracted position P13, the discharge position P11 is a position at which the liquid discharge section 21 comes closest to the transport belt 19.

As illustrated in FIG. 3, the maintenance position P12 is a position when the maintenance is performed on the liquid discharge section 21. The maintenance position P12 is, for example, a position farther from the transport belt 19 than the discharge position P11. The maintenance position P12 is, for example, a position closer to the transport belt 19 than the retracted position P13.

As illustrated in FIG. 4, the retracted position P13 is a position when the liquid discharge section 21 is retracted. Out of the discharge position P11, the maintenance position P12, and the retracted position P13, the retracted position P13 is a position farthest from the transport belt 19.

As illustrated in FIGS. 2 to 4, the maintenance section 22 includes a cap section 40. The cap section 40 is located on the side of the direction D2 opposite to the discharge direction D1 of the maintenance section 22. The cap section 40 can cover the nozzle surface 32. The cap section 40 performs the maintenance of the liquid discharge section 21.

Figure 5:
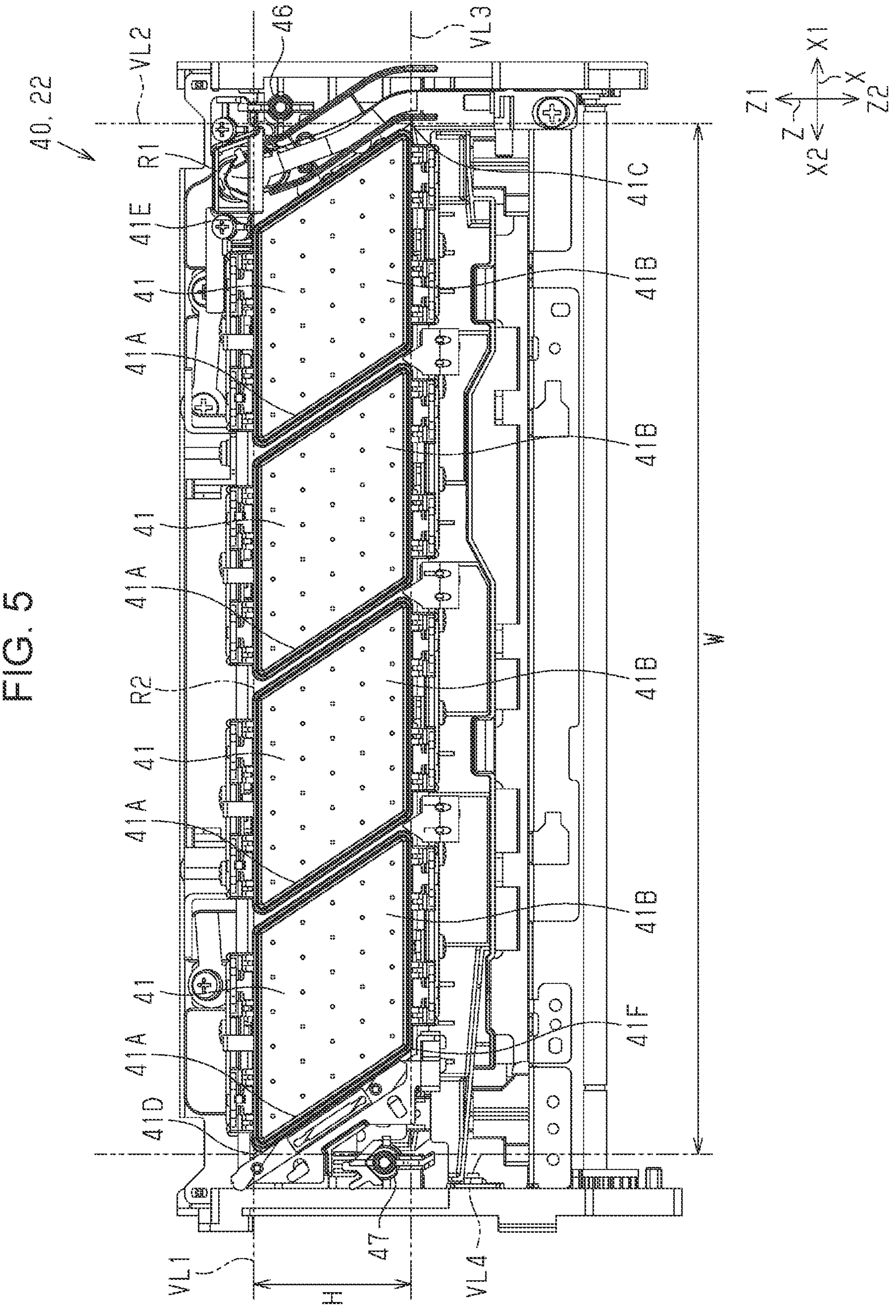
FIG. 5 is a front view illustrating a cap section.

As illustrated in FIG. 5, the cap section 40 includes a cap member 41. The cap section 40 may include one or a plurality of cap members 41. The cap section 40 includes four cap members 41, but may include one, three, and five or more cap members 41.

The cap member 41 can cover the nozzle surface 32. The cap member 41 performs capping of the liquid discharge section 21 by coming into contact with the liquid discharge section 21. The capping is the maintenance for reducing dry of the liquid in the nozzle 31 by forming a closed space that covers the nozzle 31.

The cap section 40 may perform the maintenance of the liquid discharge section 21 by receiving the liquid discharged by the liquid discharge section 21 by flushing. The flushing is an operation in which the liquid discharge section 21 appropriately discharges the liquid. The flushing is the maintenance for suppressing clogging of the nozzle 31. In addition to the capping and the flushing, the maintenance section 22 may perform the maintenance of the liquid discharge section 21, such as pressurization cleaning.

The cap member 41 includes a wall portion 41A and an opening portion 41B. The wall portion 41A is provided at an outer edge portion of the cap member 41. The wall portion 41A is provided to surround an outer edge of the opening portion 41B. The wall portion 41A protrudes in the direction D2 opposite to the discharge direction D1. The opening portion 41B is open in the direction D2 opposite to the discharge direction D1. The cap member 41 can form the closed space in which the nozzle 31 is open by the opening portion 41B coming into contact with the liquid discharge section 21.

The cap member 41 is arranged in a second region R2 of a first region R1. The first region R1 has a rectangular shape having a width W and a height H when viewed from the direction D2 opposite to the discharge direction D1. The second region R2 has a parallelogram shape when viewed from the direction D2 opposite to the discharge direction D1. In other words, the cap member 41 is provided in the parallelogram shape when viewed in the first movement direction D. The width W may be longer than the height H. In other words, the width direction X of the cap member 41 may be longitudinal.

The cap member 41 has a first acute angle portion 41C and a second acute angle portion 41D. The first acute angle portion 41C is one acute angle of the parallelogram shape when viewed from the first movement direction D along the discharge direction D1. Specifically, the first acute angle portion 41C is an acute angle of the parallelogram shape on a side of the first width direction X1. On the other hand, the second acute angle portion 41D is the other acute angle of the parallelogram shape when viewed from the first movement direction D along the discharge direction D1. Specifically, the second acute angle portion 41D is an acute angle of the parallelogram shape on a side of the second width direction X2.

The cap member 41 includes a first obtuse angle portion 41E and a second obtuse angle portion 41F. The first obtuse angle portion 41E is one obtuse angle of the parallelogram shape when viewed from the first movement direction D along the discharge direction D1. Specifically, the first obtuse angle portion 41E is an obtuse angle of the parallelogram shape on the side of the first width direction X1. On the other hand, the second obtuse angle portion 41F is the other obtuse angle of the parallelogram shape when viewed from the first movement direction D along the discharge direction D1. Specifically, the second obtuse angle portion 41F is an obtuse angle of the parallelogram shape on the side of the second width direction X2.

As illustrated in FIGS. 2 to 4, the cap section 40 includes a biasing section 42. The biasing section 42 biases the cap member 41 toward the nozzle section 30. The biasing means pushing back a target when a force is applied to the target. The biasing section 42 may be, for example, a spring. When the liquid discharge section 21 moves from the retracted position P13 to the maintenance position P12 along the first movement direction D, the biasing section 42 biases the cap member 41 toward the nozzle section 30 against the movement direction of the liquid discharge section 21 in a state in which the cap member 41 covers the nozzle surface 32. As a result, the nozzle section 30 is pushed into the cap member 41 against the biasing by the biasing section 42.

The maintenance section 22 includes a second rack 43. The second rack 43 is provided on a side of the discharge direction D1 of the maintenance section 22. The second rack 43 is provided to extend along the second movement direction C.

The maintenance movement section 23 includes a second wheel 44. The second wheel 44 is mounted to rotate about a second rotation shaft 44A. The second rotation shaft 44A is provided to extend along the width direction X. The second wheel 44 can be fitted with the second rack 43.

The maintenance movement section 23 includes a second driving source 45. The second driving source 45 is a driving source of the second wheel 44. The second driving source 45 may be a motor. The maintenance movement section 23 rotates the second wheel 44 about the second rotation shaft 44A by power from the second driving source 45. The maintenance movement section 23 moves the maintenance section 22 along the second movement direction C by the rotated second wheel 44 being fitted with the second rack 43.

The maintenance section 22 can move to a standby position P21 illustrated in FIG. 2 and an execution position P22 illustrated in FIGS. 3 and 4 along the second movement direction C by the driving of the maintenance movement section 23. In other words, the maintenance movement section 23 can move the maintenance section 22 to the standby position P21 and the execution position P22.

As illustrated in FIG. 2, the standby position P21 is a position when the liquid discharge section 21 discharges the liquid to the medium 99. The standby position P21 is a position at which the cap member 41 does not face the nozzle surface 32. The standby position P21 is a position deviated from a movement region of the liquid discharge section 21. In other words, the standby position P21 is a position at which the liquid discharge section 21 can move to the discharge position P11.

As illustrated in FIGS. 3 and 4, the execution position P22 is a position when the maintenance is performed on the liquid discharge section 21. The execution position P22 is a position at which the cap member 41 faces the nozzle surface 32. The execution position P22 is a position between the liquid discharge section 21 and the transport belt 19 at the retracted position P13. The execution position P22 is a position at which the cap member 41 can cover the nozzle surface 32.

When the liquid discharge section 21 is located at the retracted position P13, the control section 25 controls the maintenance movement section 23 to move the maintenance section 22 between the standby position P21 and the execution position P22. When the liquid discharge section 21 is not located at the retracted position P13, the control section 25 does not move the maintenance section 22 from the standby position P21 to the execution position P22.

When the control section 25 moves the liquid discharge section 21 between the discharge position P11 and the maintenance position P12, the control section 25 may control the movement section 24 to temporarily retract the liquid discharge section 21 to the retracted position P13. In particular, when the maintenance section 22 is located at the standby position P21, the control section 25 controls the movement section 24 to move the liquid discharge section 21 from the retracted position P13 to the discharge position P11. When the maintenance section 22 is located at the execution position P22, the control section 25 does not move the liquid discharge section 21 from the retracted position P13 to the discharge position P11. When the maintenance section 22 is located at the execution position P22, the movement section 24 controls the movement section 24 to move the liquid discharge section 21 from the retracted position P13 to the maintenance position P12.

As described above, when the maintenance section 22 is located at the execution position P22, the movement section 24 can move the liquid discharge section 21 toward the maintenance section 22 along the first movement direction D.

As illustrated in FIG. 5, the cap section 40 includes a first positioning section 46 and a second positioning section 47 as positioning sections, but may include three or more positioning sections. In this way, the maintenance section 22 includes the first positioning section 46 and the second positioning section 47.

The first positioning section 46 and the second positioning section 47 performs positioning of the cap section 40 and the liquid discharge section 21 by coming into contact with the liquid discharge section 21. Specifically, the first positioning section 46 and the second positioning section 47 regulate relative movement between the cap section 40 and the liquid discharge section 21 in the second movement direction C when the cap section 40 and the liquid discharge section 21 come into contact with each other as the liquid discharge section 21 moves to the cap section 40. The first positioning section 46 and the second positioning section 47 regulate relative movement between the cap section 40 and the liquid discharge section 21 in the first movement direction D when the cap section 40 and the liquid discharge section 21 come into contact with each other as the liquid discharge section 21 moves to the cap section 40.

The first positioning section 46 is located on a side of the transport direction C1 with, as a reference, the center of the second region R2 in the second movement direction C. The first positioning section 46 is provided at a position that straddles a first virtual line VL1. The first virtual line VL1 is a virtual line along the width direction X, and is a virtual line passing through the first obtuse angle portion 41E along an upper side of the second region R2. In other words, a part of the first positioning section 46 is provided in a region overlapping the first obtuse angle portion 41E in the width direction X.

The first positioning section 46 is located on the side of the first width direction X1 of the second region R2 in the width direction X. The first positioning section 46 is provided at a position that straddles a second virtual line VL2. The second virtual line VL2 is a virtual line along the second movement direction C, and is a virtual line passing through the first acute angle portion 41C. In other words, a part of the first positioning section 46 is provided in a region overlapping the first acute angle portion 41C in the second movement direction C.

On the other hand, the second positioning section 47 is located on a side of the direction C2 opposite to the transport direction C1 with, as a reference, the center of the second region R2 in the second movement direction C. The second positioning section 47 is provided at a position that straddles a third virtual line VL3. The third virtual line VL3 is a virtual line along the width direction X, and is a virtual line passing through the second obtuse angle portion 41F along a lower side of the second region R2. In other words, a part of the second positioning section 47 is provided in a region overlapping the second obtuse angle portion 41F in the width direction X.

The second positioning section 47 is located on a side of the second width direction X2 of the second region R2 in the width direction X. The second positioning section 47 is provided at a position that straddles a fourth virtual line VL4. The fourth virtual line VL4 is a virtual line along the second movement direction C, and is a virtual line passing through the second acute angle portion 41D. In other words, a part of the second positioning section 47 is provided in a region overlapping the second acute angle portion 41D in the second movement direction C.

As described above, the first positioning section 46 and the second positioning section 47 are provided at positions with the cap member 41 interposed therebetween in the second movement direction C. The first positioning section 46 is provided on a side of the transport direction C1 with respect to the second positioning section 47. It should be noted that the first rack 33 is provided on the side of the direction C2 opposite to the transport direction C1 of the liquid discharge section 21. Therefore, it can be said that the first positioning section 46 is provided at a position farther than the second positioning section 47 in the second movement direction C with, as a reference, the action point at which the movement section 24 acts on the liquid discharge section 21. The first positioning section 46 is provided on the upper side Z1 than the second positioning section 47 in the vertical direction Z.

Configurations of Positioning Sections 46 and 47

Next, the first positioning section 46 and the second positioning section 47 will be described with reference to FIGS. 6 to 8.

Figure 6:
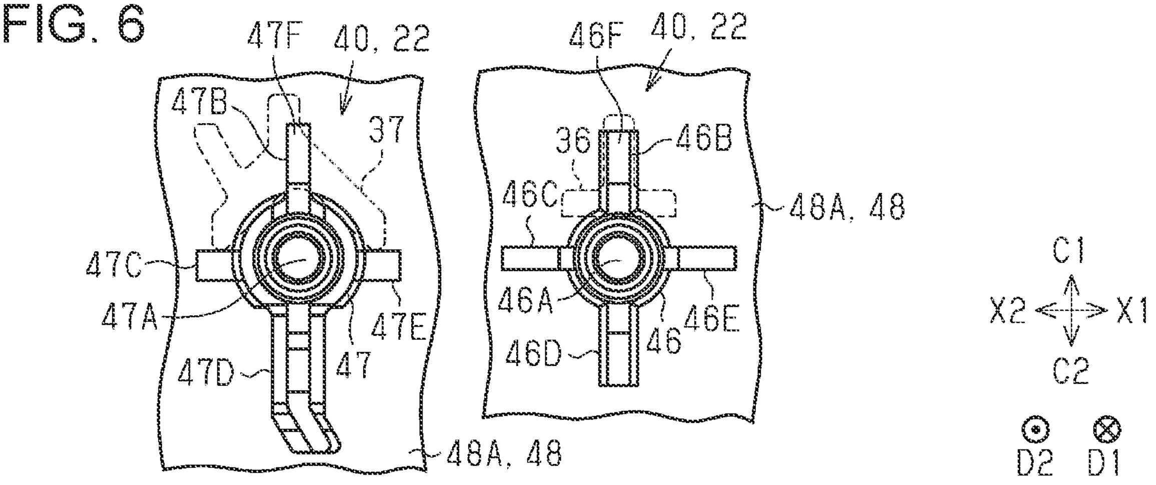
FIG. 6 is a schematic view illustrating a first positioning section.
Figure 7:
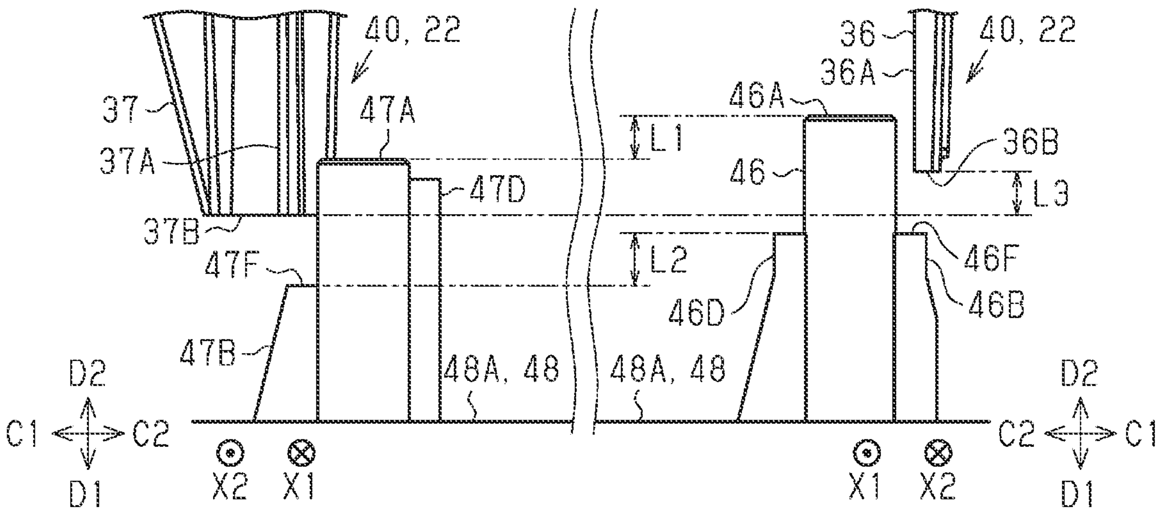
FIG. 7 is a schematic view illustrating a second positioning section.

As illustrated in FIGS. 6 and 7, the cap section 40 includes a base portion 48. The first positioning section 46 and the second positioning section 47 are provided to extend from an upper surface 48A of the base portion 48 in the direction D2 opposite to the discharge direction D1.

The first positioning section 46 may include a first guide section 46A. The first guide section 46A is configured to protrude from an upper surface 48A of the base portion 48 in the direction D2 opposite to the discharge direction D1. The first guide section 46A may have a cylindrical shape.

The first guide section 46A can suppress the displacement of the liquid discharge section 21 in the second movement direction C by coming into contact with a first contact target portion 36 of the liquid discharge section 21 in the second movement direction C. As a result, the first guide section 46A guides the movement of the liquid discharge section 21 in the first movement direction D.

The first positioning section 46 may include a plurality of extension portions 46B to 46E. Each of the plurality of extension portions 46B to 46E is configured to protrude from the upper surface 48A of the base portion 48 in the direction D2 opposite to the discharge direction D1. Each of the plurality of extension portions 46B to 46E is provided integrally with the first guide section 46A, but may be provided separately. Each of the plurality of extension portions 46B to 46E may function as a rib of the first guide section 46A.

The plurality of extension portions 46B to 46E are configured to extend from the first guide section 46A in the second movement direction C and the width direction X, respectively. Each of the plurality of extension portions 46B to 46E may be shorter than the first guide section 46A in the first movement direction D with, as a reference, the upper surface 48A of the base portion 48.

The plurality of extension portions 46B to 46E include a first extension portion 46B. The first extension portion 46B is configured to extend from the first guide section 46A in the transport direction C1. The first extension portion 46B has a first contact surface 46F. The first contact surface 46F is a surface facing the direction D2 opposite to the discharge direction D1. The first contact surface 46F is a surface facing the first contact target portion 36 of the liquid discharge section 21 in the direction D2 opposite to the discharge direction D1. In other words, the first contact surface 46F is a surface that can come into contact with the first contact target portion 36 of the liquid discharge section 21 in the first movement direction D.

The second positioning section 47 may include a second guide section 47A. The second guide section 47A is configured to protrude from the upper surface 48A of the base portion 48 in the direction D2 opposite to the discharge direction D1. The second guide section 47A may have a cylindrical shape.

The second guide section 47A can suppress the displacement of the liquid discharge section 21 in the second movement direction C by coming into contact with a second contact target portion 37 of the liquid discharge section 21 in the second movement direction C. As a result, the second guide section 47A guides the movement of the liquid discharge section 21 in the first movement direction D.

The second positioning section 47 may include a plurality of extension portions 47B to 47E. Each of the plurality of extension portions 47B to 47E is configured to protrude from the upper surface 48A of the base portion 48 in the direction D2 opposite to the discharge direction D1. Each of the plurality of extension portions 47B to 47E is provided integrally with the second guide section 47A, but may be provided separately. Each of the plurality of extension portions 47B to 47E may function as a rib of the second guide section 47A.

The plurality of extension portions 47B to 47E are configured to extend from the second guide section 47A in the second movement direction C and the width direction X, respectively. Each of the plurality of extension portions 47B to 47E may be shorter than the second guide section 47A in the first movement direction D with, as a reference, the upper surface 48A of the base portion 48.

The plurality of extension portions 47B to 47E include a second extension portion 47B. The second extension portion 47B is configured to extend from the second guide section 47A in the transport direction C1. The second extension portion 47B has a second contact surface 47F. The second contact surface 47F is a surface facing the direction D2 opposite to the discharge direction D1. The second contact surface 47F is a surface facing the second contact target portion 37 of the liquid discharge section 21 in the discharge direction D1. In other words, the second contact surface 47F is a surface that can come into contact with the second contact target portion 37 of the liquid discharge section 21 in the discharge direction D1.

The liquid discharge section 21 includes the first contact target portion 36. The first contact target portion 36 comes into contact with the first positioning section 46. The first contact target portion 36 is configured to protrude in the discharge direction D1. The first contact target portion 36 can move in the first movement direction D as the liquid discharge section 21 moves.

The first contact target portion 36 has a first guide surface 36A. The first guide surface 36A is a surface facing the direction C2 opposite to the transport direction C1. The first guide surface 36A is a surface guided by the first guide section 46A as the liquid discharge section 21 moves. In other words, the first contact target portion 36 is guided by the first guide section 46A.

The first contact target portion 36 has a first contact target surface 36B. The first contact target surface 36B is a surface facing the discharge direction D1. The first contact target surface 36B faces the first contact surface 46F of the first positioning section 46.

The liquid discharge section 21 includes the second contact target portion 37. The second contact target portion 37 comes into contact with the second positioning section 47. The second contact target portion 37 is configured to protrude in the discharge direction D1. The second contact target portion 37 can move in the first movement direction D as the liquid discharge section 21 moves.

The second contact target portion 37 has a second guide surface 37A. The second guide surface 37A is a surface facing the direction C2 opposite to the transport direction C1. The second guide surface 37A is a surface guided by the second guide section 47A as the liquid discharge section 21 moves. In other words, the second contact target portion 37 is guided by the second guide section 47A.

The second contact target portion 37 has a second contact target surface 37B. The second contact target surface 37B is a surface facing the discharge direction D1. The second contact target surface 37B faces the second contact surface 47F of the second positioning section 47.

As illustrated in FIG. 7, the first guide section 46A may be longer than the second guide section 47A by a length L1 in the first movement direction D with, as a reference, the upper surface 48A of the base portion 48. The first contact surface 46F may be higher than the second contact surface 47F by a length L2 in the first movement direction D with, as a reference, the upper surface 48A of the base portion 48. In other words, the first positioning section 46 may be longer than the second positioning section 47 in the first movement direction D. The first positioning section 46 may be provided at a position closer to the liquid discharge section 21 than the second positioning section 47 in the first movement direction D. It should be noted that the second contact target portion 37 may be provided at a position closer to the upper surface 48A of the base portion 48 than the first contact target portion 36 by a length L3.

Figure 8:
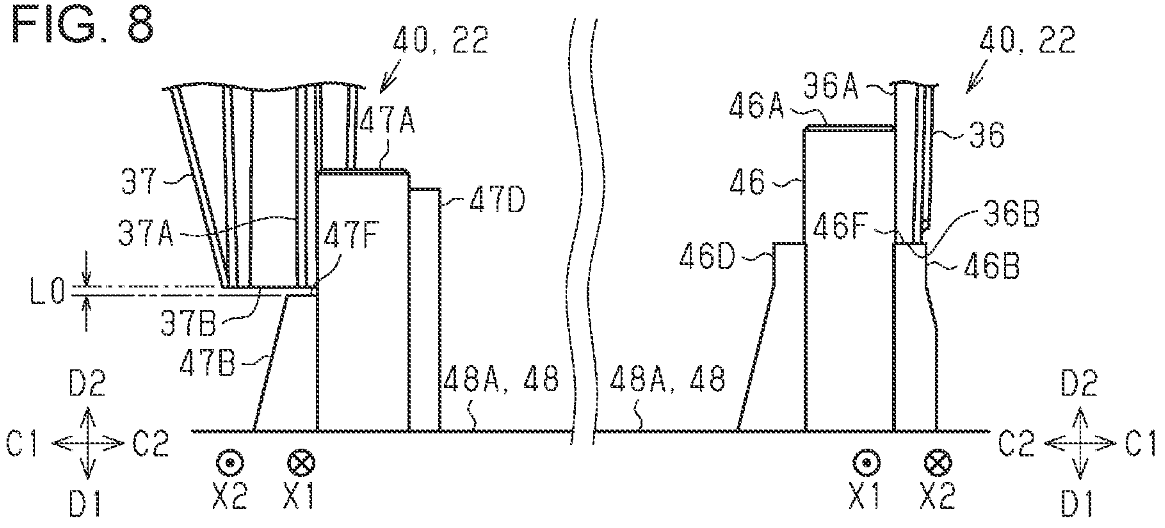
FIG. 8 is a schematic view illustrating a positional relationship between the liquid discharge section and the maintenance section.

As illustrated in FIG. 8, when the first contact target portion 36 comes into contact with the first contact surface 46F, the second contact target portion 37 does not come into contact with the second contact surface 47F. Specifically, when the first contact target portion 36 comes into contact with the first contact surface 46F, the second contact target portion 37 may be separated from the second contact surface 47F by a length L0. As a result, the first positioning section 46 comes into contact with the liquid discharge section 21 before the second positioning section 47 when the liquid discharge section 21 moves toward the maintenance section 22.

A distance between the first contact surface 46F and the first contact target surface 36B may be defined as a distance corresponding to a minimum amount of sink required for positioning the liquid discharge section 21 and the maintenance section 22 in the first movement direction D. On the other hand, a distance between the second contact surface 47F and the second contact target surface 37B may be defined as a distance corresponding to a maximum amount of sink such that the liquid discharge section 21 does not excessively come into contact with the maintenance section 22. In the present embodiment, the first movement direction D corresponds to an example of a first direction, and the second movement direction C corresponds to an example of a second direction.

Actions of First Embodiment

The actions of the first embodiment will be described.

When the maintenance section 22 is located at the execution position P22, the liquid discharge section 21 moves from the retracted position P13 to the maintenance position P12 by the action from the movement section 24. The movement section 24 acts on the liquid discharge section 21 on the side of the direction C2 opposite to the transport direction C1.

In such a case, the liquid discharge section 21 moves in the discharge direction D1 such that the first guide surface 36A is along the first guide section 46A of the maintenance section 22 and the second guide surface 37A is along the second guide section 47A of the maintenance section 22. As a result, the liquid discharge section 21 is positioned at the maintenance section 22 in the second movement direction C. When the first contact target surface 36B comes into contact with the first contact surface 46F, the liquid discharge section 21 is positioned by the maintenance section 22 in the first movement direction D.

In the related art, when the liquid discharge section 21 moves toward the maintenance section 22, the positioning section close to the action point of the movement section 24 comes into contact with the liquid discharge section 21 before the positioning section far from the action point of the movement section 24 in the second movement direction C. In such a case, the liquid discharge section 21 may rotate up to an excessive angle with respect to the direction separated from the maintenance section 22 with the positioning section close to the action point of the movement section 24 as a fulcrum. Such an event is a factor that decreases the positioning accuracy of the liquid discharge section 21 and the maintenance section 22.

In particular, when the first movement direction D in which the liquid discharge section 21 moves is inclined from the vertical direction Z, the dead weight of the liquid discharge section 21 in the first movement direction D is reduced. In such a configuration, there is also a tendency that the liquid discharge section 21 rotates up to an excessive angle with respect to the direction separated from the maintenance section 22.

Therefore, in the present embodiment, a configuration is adopted in which the first contact target surface 36B comes into contact with the first contact surface 46F before the second contact target surface 37B comes into contact with the second contact surface 47F when the liquid discharge section 21 moves toward the maintenance section 22 along the first movement direction D. In other words, when the first contact target surface 36B comes into contact with the first contact surface 46F, the second contact target surface 37B does not come into contact with the second contact surface 47F.

As a result, when the first contact target surface 36B and the first contact surface 46F come into contact with each other, the force acting from the movement section 24 on the liquid discharge section 21 is transmitted to the first contact surface 46F through the first contact target surface 36B. The liquid discharge section 21 receives a drag force from the first contact surface 46F through the first contact target surface 36B. The liquid discharge section 21 can reduce the angle at which the liquid discharge section 21 rotates in the direction separated from the maintenance section 22 when the drag force is received from the first contact surface 46F through the first contact target surface 36B than when the drag force is received from the second contact surface 47F through the second contact target surface 37B. Therefore, the positioning accuracy of the liquid discharge section 21 and the maintenance section 22 can be improved.

Effects of First Embodiment

The effects of the first embodiment will be described.

1. The first positioning section 46 is provided at the position farther than the second positioning section 47 in the second movement direction C with, as a reference, the action point at which the movement section 24 acts on the liquid discharge section 21. The first positioning section 46 comes into contact with the liquid discharge section 21 before the second positioning section 47 when the liquid discharge section 21 moves toward the maintenance section 22. Therefore, the liquid discharge section 21 can be moved toward the maintenance section 22 such that the second positioning section 47 is not brought into contact with the liquid discharge section 21 before the first positioning section 46. As a result, it is possible to suppress the rotation of the liquid discharge section 21 with the second positioning section 47 as the rotation center in the direction in which the liquid discharge section 21 and the maintenance section 22 are separated from each other. In this way, it is possible to stably position the liquid discharge section 21 and the maintenance section 22. Therefore, the positioning accuracy of the liquid discharge section 21 and the maintenance section 22 can be improved.

2. The first positioning section 46 is provided at a position closer to the liquid discharge section 21 than the second positioning section 47 in the first movement direction D. Therefore, by adjusting the positional relationship between the first positioning section 46 and the second positioning section 47 with the liquid discharge section 21 in the first movement direction D, the first positioning section 46 can be brought into contact with the liquid discharge section 21 before the second positioning section 47. In this way, it is possible to stably position the liquid discharge section 21 and the maintenance section 22. Therefore, the positioning accuracy of the liquid discharge section 21 and the maintenance section 22 can be improved.

3. The first positioning section 46 is longer than the second positioning section 47 in the first movement direction D. Therefore, by adjusting the lengths of the first positioning section 46 and the second positioning section 47 in the first movement direction D, the first positioning section 46 can be brought into contact with the liquid discharge section 21 before the second positioning section 47. In this way, it is possible to stably position the liquid discharge section 21 and the maintenance section 22. Therefore, the positioning accuracy of the liquid discharge section 21 and the maintenance section 22 can be improved.

4. The maintenance section 22 includes the cap section 40. The cap section 40 includes the cap member 41 that can cover the nozzle surface 32. Therefore, it is possible to stably position the nozzle surface 32 and the cap member 41. Therefore, the positioning accuracy of the liquid discharge section 21 and the cap section 40 can be improved. As a result, the leakage of the liquid from the nozzle surface 32 can be suppressed.

5. The first positioning section 46 and the second positioning section 47 are provided at positions with the cap member 41 interposed therebetween in the second movement direction C. Therefore, it is possible to stably position the nozzle surface 32 and the cap member 41 in the second movement direction C. Therefore, the positioning accuracy of the liquid discharge section 21 and the cap section 40 can be improved. As a result, the leakage of the liquid from the nozzle surface 32 can be suppressed.

6. The cap member 41 is provided in the parallelogram shape when viewed in the first movement direction D. At least a part of the first positioning section 46 is provided in a region overlapping the first acute angle portion 41C in the second movement direction C, and at least a part of the second positioning section 47 is provided in a region overlapping the second acute angle portion 41D in the second movement direction C. Therefore, the first positioning section 46 and the second positioning section 47 can be provided at positions close to the cap member 41, according to the shape of the cap member 41. Therefore, the space of the cap section 40 can be saved. In addition, even with such a configuration, it is possible to improve the positioning accuracy of the liquid discharge section 21 and the maintenance section 22.

7. The angle formed by the first movement direction D and the horizontal direction is 15 degrees. Therefore, the amount of vector in the first movement direction D generated by the dead weight of the liquid discharge section 21 is equal to or less than half. As a result, the size in the horizontal direction can be reduced, and the load for moving the liquid discharge section 21 can be suppressed. In addition, even with such a configuration, it is possible to improve the positioning accuracy of the liquid discharge section 21 and the maintenance section 22.

Modification Examples

The present embodiment can be modified and carried out as follows. The present embodiment and the modification examples described below can be carried out in combination with each other within a technically consistent range.

The angle formed by the first movement direction D and the horizontal direction may be larger than 0 degrees and equal to or less than 30 degrees, and is preferably equal to or larger than 5 degrees and equal to or less than 15 degrees. As a result, the size in the horizontal direction can be reduced, and the load for moving the liquid discharge section 21 can be suppressed. In particular, when the angle formed by the first movement direction D and the horizontal direction is 30 degrees, the amount of vector in the first movement direction D generated by the dead weight of the liquid discharge section 21 is halved.

The movement section 24 may be configured to move the maintenance section 22 toward the liquid discharge section 21 out of the liquid discharge section 21 and the maintenance section 22. In other words, the movement section 24 need only be configured to move one of the liquid discharge section 21 and the maintenance section 22 toward the other of the liquid discharge section 21 and the maintenance section 22.

At least any one of the first positioning section 46 and the second positioning section 47 may be provided between the second regions R2. A positioning section other than the first positioning section 46 and the second positioning section 47 may be provided between the second regions R2.

The entire first positioning section 46 may be located in the first region R1. In other words, at least a part of the first positioning section 46 may be provided in the region overlapping the first acute angle portion 41C in the second movement direction C intersecting with the first movement direction D.

The entire second positioning section 47 may be located in the first region R1. In other words, at least a part of the second positioning section 47 may be provided in the region overlapping the second acute angle portion 41D in the second movement direction C intersecting with the first movement direction D.

The cap member 41 does not have to have the parallelogram shape when viewed in the first movement direction D. For example, the cap member 41 may have a rectangular shape when viewed in the first movement direction D.

The movement section 24 may act as the liquid discharge section 21 in the transport direction C1. In other words, the action point at which the movement section 24 acts on the liquid discharge section 21 may be on the side of the transport direction C1 of the liquid discharge section 21. In this case, the side of the direction C2 opposite to the transport direction C1 is a position far from the action point.

The first positioning section 46 does not have to include the first guide section 46A. In other words, when the first positioning section 46 can perform the positioning of the liquid discharge section 21 and the maintenance section 22 in at least the first movement direction D, the first positioning section 46 does not have to perform the positioning in the second movement direction C. The first positioning section 46 may perform the positioning of the liquid discharge section 21 and the maintenance section 22 in the width direction X.

The second positioning section 47 does not have to include the second guide section 47A. In other words, when the second positioning section 47 can perform the positioning of the liquid discharge section 21 and the maintenance section 22 in at least the first movement direction D, the second positioning section 47 does not have to perform the positioning in the second movement direction C. The second positioning section 47 may position the liquid discharge section 21 and the maintenance section 22 in the width direction X.

As long as the first positioning section 46 and the first contact target portion 36 can come into contact with each other in at least the first movement direction D, the shapes of the first positioning section 46 and the first contact target portion 36 do not matter. The first positioning section 46 may have, for example, a protruding shape or a recessed shape. The first contact target portion 36 may have, for example, a protruding shape or a recessed shape.

As long as the second positioning section 47 and the second contact target portion 37 can come into contact with each other in at least the first movement direction D, the shapes of the second positioning section 47 and the second contact target portion 37 do not matter. The second positioning section 47 may have, for example, a protruding shape or a recessed shape. The second contact target portion 37 may have, for example, a protruding shape or a recessed shape.

When the liquid discharge section 21 moves toward the maintenance section 22, when the first positioning section 46 comes into contact with the liquid discharge section 21 before the second positioning section 47 in the first movement direction D, the first positioning section 46 does not have to be provided at a position closer to the liquid discharge section 21 than the second positioning section 47.

When the liquid discharge section 21 moves toward the maintenance section 22, when the first positioning section 46 comes into contact with the liquid discharge section 21 before the second positioning section 47 in the first movement direction D, the first positioning section 46 does not have to be longer than the second positioning section 47 in the first movement direction D.

The first contact target portion 36 may be provided at a position closer to the cap section 40 than the second contact target portion 37 in the first movement direction D, and may be provided at a position farther from the cap section 40 than the second contact target portion 37. In other words, when the liquid discharge section 21 moves toward the maintenance section 22, the first positioning section 46 need only come into contact with the liquid discharge section 21 before the second positioning section 47 in the first movement direction D. Therefore, by adjusting the lengths of the first contact target portion 36 and the second contact target portion 37 in the first movement direction D, the first positioning section 46 can be brought into contact with the liquid discharge section 21 before the second positioning section 47. In this way, it is possible to stably position the liquid discharge section 21 and the maintenance section 22. Therefore, the positioning accuracy of the liquid discharge section 21 and the maintenance section 22 can be improved.

A configuration corresponding to the first contact target portion 36 and the second contact target portion 37 may be provided on the maintenance section 22, whereas a configuration corresponding to the first positioning section 46 and the second positioning section 47 is provided on the liquid discharge section 21.

The maintenance section 22 may include the wiping section. The wiping section is configured to wipe the nozzle surface 32. In other words, the wiping section may perform the maintenance on the liquid discharge section 21 by wiping the nozzle surface 32.

A configuration corresponding to the first positioning section 46 and the second positioning section 47 may be provided on the liquid discharge section 21 as a positioning section that performs the positioning of the liquid discharge section 21 and the transport belt 19 when the liquid discharge section 21 is moved to the transport belt 19. A configuration corresponding to the first positioning section 46 and the second positioning section 47 may be provided on a side of the transport belt 19 as a positioning section that performs the positioning of the liquid discharge section 21 and the transport belt 19 when the liquid discharge section 21 is moved to the transport belt 19. Further, the transport belt 19 does not have to be an endless belt as long as the medium 99 can be supported.

At least one of the first positioning section 46 and the second positioning section 47 may have elasticity in the first movement direction D.

The liquid discharge apparatus 11 may discharge liquid other than the ink to perform recording. A state of the liquid discharged as a minute amount of droplets from the liquid discharge apparatus 11 includes liquid having a granular, lacrimal, or filamentous tail. The liquid here need only be any material that can be discharged from the liquid discharge apparatus 11. For example, the liquid need only be in any state as long as the substance is in a liquid phase, and includes a fluid body, such as a liquid material having high or low viscosity, sol, gel water, other inorganic solvent, organic solvent, solution, liquid resin, liquid metal, or metallic melt. The liquid includes, in addition to the liquid as one state of the substance, a substance in which particles of a functional material composed of a solid material, such as a pigment and metal particles, are dissolved, dispersed, or mixed in a solvent, and the like. Representative examples of the liquid include ink and liquid crystal as described in the embodiment described above. Here, the ink includes general water-based ink and oil-based ink as well as various types of liquid compositions, such as gel ink or hot melt ink. As a specific example of the liquid discharge apparatus 11, for example, there is an apparatus that discharges liquid containing a material, such as an electrode material or a coloring material used for manufacturing a liquid crystal display, an electroluminescence display, a surface emitting display, or a color filter, in a dispersed or dissolved form. The liquid discharge apparatus 11 may be an apparatus that discharges a bioorganic substance used for manufacturing a biochip, an apparatus that discharges liquid as a sample used as a precision pipette, a printing apparatus, a micro dispenser, or the like. The liquid discharge apparatus 11 may be an apparatus that discharges lubricating oil to precision machinery, such as a watch or a camera, with pinpoint accuracy, or an apparatus that discharges transparent resin liquid, such as an ultraviolet curable resin, onto a substrate to form a micro hemispherical lens, an optical lens, and the like used for an optical communication element or the like. The liquid discharge apparatus 11 may be an apparatus that discharge an etching solution, such as an acid or an alkali, to etch a substrate or the like.

The expression “at least any one of” used in the present specification means one or more of desired options. As an example, the expression “at least any one of” used in the present specification means only one option or both of two options when the number of options is two. In another example, the expression “at least any one of” used in the present specification means only one option or a combination of any two or more options when the number of options is three or more.

Supplementary Notes

Hereinafter, the technical ideas and the actions and effects grasped from the embodiment and the modification examples described above will be described.

A. A liquid discharge apparatus includes a liquid discharge section configured to discharge liquid, a maintenance section that performs maintenance of the liquid discharge section, and a movement section configured to move one of the liquid discharge section and the maintenance section toward another of the liquid discharge section and the maintenance section along a first direction intersecting with a horizontal direction and a vertical direction, in which the maintenance section includes a first positioning section and a second positioning section, the first positioning section and the second positioning section perform positioning of the maintenance section and the liquid discharge section by coming into contact with the liquid discharge section, the first positioning section is provided at a position farther than the second positioning section in a second direction intersecting with the first direction with, as a reference, an action point at which the movement section acts on the one of the liquid discharge section and the maintenance section, and the first positioning section comes into contact with the liquid discharge section before the second positioning section when the one of the liquid discharge section and the maintenance section moves toward the other of the liquid discharge section and the maintenance section.

With this configuration, any one of the liquid discharge section and the maintenance section can be moved toward the other of the liquid discharge section and the maintenance section such that the second positioning section is not brought into contact with the liquid discharge section before the first positioning section. As a result, it is possible to suppress the rotation of any one of the liquid discharge section and the maintenance section in the direction with the second positioning section as the rotation center in which the liquid discharge section and the maintenance section are separated from each other. In this way, it is possible to stably position the liquid discharge section and the maintenance section. Therefore, the positioning accuracy of the liquid discharge section and the maintenance section can be improved.

B. In the liquid discharge apparatus described above, the first positioning section may be provided at a position closer to the liquid discharge section than the second positioning section in the first direction.

With this configuration, by adjusting the positional relationship between the first positioning section and the second positioning section with the liquid discharge section in the first direction, the first positioning section can be brought into contact with the liquid discharge section before the second positioning section. In this way, it is possible to stably position the liquid discharge section and the maintenance section. Therefore, the positioning accuracy of the liquid discharge section and the maintenance section can be improved.

C. In the liquid discharge apparatus described above, the first positioning section may be longer than the second positioning section in the first direction.

With this configuration, by adjusting the lengths of the first positioning section and the second positioning section in the first direction, the first positioning section can be brought into contact with the liquid discharge section before the second positioning section. In this way, it is possible to stably position the liquid discharge section and the maintenance section. Therefore, the positioning accuracy of the liquid discharge section and the maintenance section can be improved.

D. In the liquid discharge apparatus described above, the liquid discharge section may include a nozzle configured to discharge the liquid and a nozzle surface on which the nozzle is open, the maintenance section may include a cap section, and the cap section may include a cap member configured to cover the nozzle surface.

With this configuration, it is possible to stably position the nozzle surface and the cap member. Therefore, the positioning accuracy of the liquid discharge section and the cap section can be improved. As a result, the leakage of the liquid from the nozzle surface can be suppressed.

E. In the liquid discharge apparatus described above, the first positioning section and the second positioning section may be provided at positions with the cap member interposed therebetween in the second direction.

With this configuration, it is possible to stably position the nozzle surface and the cap member in the second direction. Therefore, the positioning accuracy of the liquid discharge section and the cap section can be improved. As a result, the leakage of the liquid from the nozzle surface can be suppressed.

F. In the liquid discharge apparatus described above, the cap member may be provided in a parallelogram shape when viewed from the first direction, the cap member may include a first acute angle portion that is one acute angle of the parallelogram shape when viewed from the first direction and a second acute angle portion that is another acute angle of the parallelogram shape when viewed from the first direction, at least a part of the first positioning section may be provided in a region overlapping the first acute angle portion in a direction intersecting with the first direction, and at least a part of the second positioning section may be provided in a region overlapping the second acute angle portion in a direction intersecting with the first direction.

With this configuration, the first positioning section and the second positioning section can be provided at positions close to the cap member, according to the shape of the cap member. Therefore, the space of the cap section can be saved. In addition, even with such a configuration, it is possible to improve the positioning accuracy between the liquid discharge section and the maintenance section.

G. In the liquid discharge apparatus described above, the movement section may be configured to move the liquid discharge section toward the maintenance section along the first direction. With this configuration, it is possible to exhibit the same effects as in A to F.

H. In the liquid discharge apparatus described above, the movement section may be configured to move the maintenance section toward the liquid discharge section along the first direction. With this configuration, it is possible to exhibit the same effects as in A to F.

I. In the liquid discharge apparatus described above, the liquid discharge section may include a first contact target portion coming into contact with the first positioning section and a second contact target portion coming into contact with the second positioning section, and the first contact target portion may be provided at a position closer to the maintenance section than the second contact target portion in the first direction.

With this configuration, by adjusting the lengths of the first contact target portion and the second contact target portion in the first direction, the first positioning section can be brought into contact with the liquid discharge section before the second positioning section. In this way, it is possible to stably position the liquid discharge section and the maintenance section. Therefore, the positioning accuracy of the liquid discharge section and the maintenance section can be improved.

J. In the liquid discharge apparatus described above, an angle formed by the first direction and the horizontal direction may be larger than 0 degrees and equal to or less than 30 degrees.

With this configuration, the amount of vector in the first movement direction generated by the dead weight of any one of the liquid discharge section or the maintenance section is equal to or less than half. As a result, the size in the horizontal direction can be reduced, and the load for moving any one of the liquid discharge section or the maintenance section can be suppressed. In addition, even with such a configuration, it is possible to improve the positioning accuracy between the liquid discharge section and the maintenance section.

What is claimed is:

1. A liquid discharge apparatus comprising:

a liquid discharge section configured to discharge liquid;

a maintenance section that performs maintenance of the liquid discharge section; and a movement section configured to move one of the liquid discharge section and the maintenance section toward another of the liquid discharge section and the maintenance section along a first direction intersecting with a horizontal direction and a vertical direction, wherein the maintenance section includes a first positioning section and a second positioning section, the first positioning section and the second positioning section perform positioning of the maintenance section and the liquid discharge section by coming into contact with the liquid discharge section, the first positioning section is provided at a position farther than the second positioning section in a second direction intersecting with the first direction with, as a reference, an action point at which the movement section acts on the one of the liquid discharge section and the maintenance section, and the first positioning section comes into contact with the liquid discharge section before the second positioning section when the one of the liquid discharge section and the maintenance section moves toward the other of the liquid discharge section and the maintenance section.

2. The liquid discharge apparatus according to claim 1, wherein the first positioning section is provided at a position closer to the liquid discharge section than the second positioning section in the first direction.

3. The liquid discharge apparatus according to claim 2, wherein the first positioning section is longer than the second positioning section in the first direction.

4. The liquid discharge apparatus according to claim 1, wherein the liquid discharge section includes a nozzle configured to discharge the liquid and a nozzle surface on which the nozzle is open, the maintenance section includes a cap section, and the cap section includes a cap member configured to cover the nozzle surface.

5. The liquid discharge apparatus according to claim 4, wherein the first positioning section and the second positioning section are provided at positions with the cap member interposed therebetween in the second direction.

6. The liquid discharge apparatus according to claim 5, wherein the cap member is provided in a parallelogram shape when viewed from the first direction, the cap member includes a first acute angle portion that is one acute angle of the parallelogram shape when viewed from the first direction and a second acute angle portion that is another acute angle of the parallelogram shape when viewed from the first direction, at least a part of the first positioning section is provided in a region overlapping the first acute angle portion in a direction intersecting with the first direction, and at least a part of the second positioning section is provided in a region overlapping the second acute angle portion in a direction intersecting with the first direction.

7. The liquid discharge apparatus according to claim 1, wherein the movement section is configured to move the liquid discharge section toward the maintenance section along the first direction.

8. The liquid discharge apparatus according to claim 1, wherein the movement section is configured to move the maintenance section toward the liquid discharge section along the first direction.

9. The liquid discharge apparatus according to claim 1, wherein the liquid discharge section includes a first contact target portion coming into contact with the first positioning section and a second contact target portion coming into contact with the second positioning section, and the first contact target portion is provided at a position closer to the maintenance section than the second contact target portion in the first direction.

10. The liquid discharge apparatus according to claim 1, wherein an angle formed by the first direction and the horizontal direction is larger than 0 degrees and equal to or less than 30 degrees.

* * * * *